(12) United States Patent
Sawamura et al.

(10) Patent No.: US 6,500,530 B1
(45) Date of Patent: Dec. 31, 2002

(54) MAGNETIC RECORDING MEDIUM

(75) Inventors: Shinzo Sawamura, Nishinomiya (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/412,146

(22) Filed: Oct. 5, 1999

(30) Foreign Application Priority Data

Oct. 6, 1998 (JP) .............................................. 10-283834

(51) Int. Cl.[7] ................................................ G11B 5/66
(52) U.S. Cl. ............................. 428/212; 428/634 ML; 428/634 MM; 428/634 EC; 428/634 GR; 428/900
(58) Field of Search ......................... 428/654, 654 ML, 428/654 MM, 654 EC, 654 GR, 212, 900

(56) References Cited

U.S. PATENT DOCUMENTS 5,240,784 A * 8/1993 Matsumoto .......... 428/694 TM
6,014,296 A * 1/2000 Ichihare ....................... 360/135
6,139,980 A * 10/2000 Matsumoto ................. 428/692

FOREIGN PATENT DOCUMENTS

JP 2617025 * 3/1997

* cited by examiner

Primary Examiner—Leszek Kiliman
(74) Attorney, Agent, or Firm—Edwards & Angell, LLP; David G. Conlin; Richard J. Roos

(57) ABSTRACT

A magnetic recording medium of the present invention comprises a first magnetic layer and a second magnetic layer each having different magnetization, coercive force, and temperature characteristics. By magnetically coupling the first and second magnetic layers to each other, gradual temperature dependence of magnetization can be realized.

21 Claims, 1 Drawing Sheet

MAGNETIC RECORDING MEDIUM

FIELD OF THE INVENTION

The present invention relates to a magnetic recording medium used for a recording device which records/reproduces information into/from a recording medium by means of magnetization while a temperature thereof is being raised.

BACKGROUND OF THE INVENTION

In the field of magnetic recording techniques, the following recording/reproducing method has been used generally. In this recording/reproducing method, a ferromagnetic material, such as CoCrTa, is used as a magnetic film for the magnetic recording medium. Information is recorded into the medium by applying an external magnetic field from a recording magnetic head, and reproduced from the medium by detecting the direction of magnetization therein using a reproducing magnetic head.

Also, another recording/reproducing method as follows has been proposed. In this recording/reproducing method, a ferromagnetic material, such as $CrO_2$, is used as a magnetic film for the magnetic recording medium. Information is recorded into the medium by applying an external magnetic field from a recording magnetic head while a coercive force therein is being reduced with irradiation of laser beams, and reproduced from the medium in the same manner as the firstly-mentioned method, that is, by detecting the direction of magnetization therein using a reproducing magnetic head.

However, in both of the above recording/reproducing methods, the width of a recordable/reproducible track is limited by the track width of the magnetic head, and therefore, narrowing the track pitch can increase recording density only to a certain extent.

In order to eliminate the above inconvenience, still another recording/reproducing method is disclosed in, for example, Japanese Patent Gazette, Patent No. 2617025 (date of registration: Mar. 11, 1997). In this recording/reproducing method, a ferrimagnetic material having a compensation point around room temperature is used as a magnetic film for the magnetic recording medium. Information is recorded into the medium by applying an external magnetic field from a recording magnetic head while the temperature is being raised in a target recording track (into which information will be recorded), and reproduced by detecting the direction of magnetization in a target reproducing track (from which information will be reproduced) while the temperature thereof is being raised.

The magnetization in the magnetic recording medium used in this recording/reproducing method has temperature dependence such that becomes nearly "0" (zero) at room temperature, and increases with rising temperatures until it reaches its maximum at a finite temperature, and then drops to "0" again at a temperature as high as or higher than the Curie temperature. Also, the coercive force of the magnetic recording medium has a large value at room temperature, and it monotonously decreases with rising temperatures until it reaches 0 at the Curie temperature.

By raising the temperature in a target recording track of the magnetic recording medium with heating means, such as laser beams, the coercive force decreases only where the temperature is raised and becomes smaller than the magnetic field applied from the magnetic recording head. Therefore, by exploiting the above characteristics, information is recorded into a domain heated by the laser beams or the like, that is, a domain which is narrower than the width of the recording magnetic head.

As to reproducing information, by raising the temperature in a target reproducing track of the magnetic recording medium, the magnetization is increased only where the temperature is raised. Here, because the temperature in the adjacent track remains at or around room temperature, substantially no magnetic flux leaks from the adjacent track. Consequently, a signal can be detected from a track narrower than the width of the reproducing magnetic head.

According to the above recording/reproducing method, information can be recorded/reproduced at high density regardless of the track widths of the recording and reproducing magnetic heads.

In order to obtain a stable reproducing signal, the above recording/reproducing method requires the following conditions: (1) the magnetization is 0 or almost 0 at room temperature; and (2) the magnetization in the heated domain is stable, that is, the magnetization should not change at or around a temperature above room temperature, at which the magnetization reaches its maximum. However, the magnetization of the magnetic recording medium in actual use changes sharply with increasing temperatures at or around the temperature at which the magnetization reaches its maximum. Therefore, it has been difficult to obtain a stable reproducing signal.

The above inconvenience can be eliminated by controlling the temperatures in a precise manner, but this demands an expensive temperature raising device equipped with a controller. Moreover, it takes a time to adjust and maintain a temperature at a certain level, thereby presenting a problem that information can not be reproduced at a high speed.

SUMMARY OF THE INVENTION

It is therefore an object of the present invention to provide a magnetic recording medium, into which information is recorded by applying an external magnetic field from a recording magnetic head while a temperature is being raised in a target recording track (into which the information will be recorded), and from which information is reproduced using a reproducing magnetic head while a temperature is being raised in a target reproducing track (from which the information will be reproduced), and by making temperature dependence of magnetization gradual, the magnetic recording medium outputs a reproducing signal that remains substantially stable in response to a change in temperature while the temperature is being raised.

To fulfill the above and other objects, a magnetic recording medium of the present invention is characterized by comprising:
  at least two magnetic layers, both having their respective magnetic compensation temperatures around room temperature, each having different magnetization, coercive force, and temperature characteristics,
  the magnetic layers being magnetically coupled to each other, wherein
  information is recorded into the magnetic recording medium by applying an external magnetic field from a recording magnetic head while a temperature is being raised in a target recording track, and information is reproduced from the magnetic recording medium using a reproducing magnetic head while a temperature is being raised in a target reproducing track, from which the information will be reproduced.

Conventionally, the magnetic recording medium uses a single-layer magnetic layer. However, because such a single-layer magnetic layer is generally made of rare earth elements having sharp temperature dependence of magnetization, the magnetization changes significantly in response to a change in temperature while the temperature is being raised. In contrast, according to the arrangement of the present invention, because the magnetic layer has at least two magnetically coupled layers, each having different magnetization, coercive force, and temperature characteristics, the temperature dependence of magnetization in the layer is made gradual as a whole. Also, by adequately selecting the kinds of magnetic layers, it has become possible to provide a magnetic recording medium having optimal magnetization, coercive force, and temperature characteristics in recording/reproducing information.

Here, "magnetically coupled" means either magnetostatic coupling or exchanged coupling. Magnetostatic coupling is defined as coupling by means of a Coulomb force, and exchanged coupling is defined as strong coupling of atoms by a quantum mechanical force.

For a fuller understanding of the nature and advantages of the invention, reference should be made to the ensuing detailed description taken in conjunction with the accompanying drawings.

DESCRIPTION OF THE EMBODIMENTS

Figure 1:
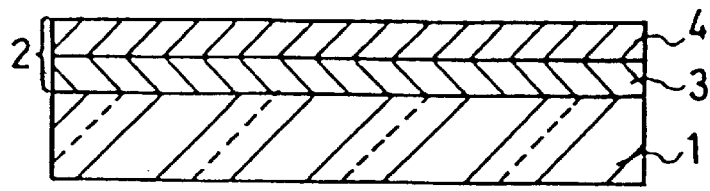
FIG. 1 is a cross section schematically showing an arrangement of a magnetic recording medium in accordance with an example embodiment of the present invention.
Figure 2:
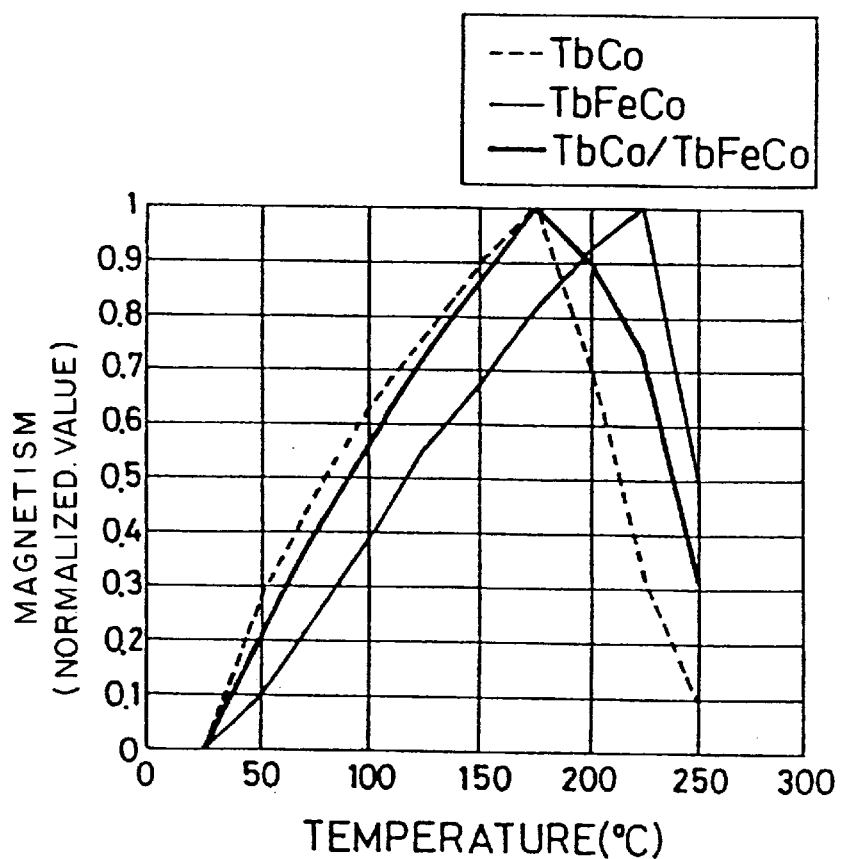
FIG. 2 is a graph showing temperature characteristics of magnetization in the magnetic recording medium of the present invention and two comparative magnetic recording media.

Referring to FIGS. 1 and 2, the following description will describe an example embodiment of the present invention.

FIG. 1 is a cross section schematically showing an arrangement of a magnetic recording medium of the present embodiment. The magnetic recording medium comprises a substrate 1 made of glass or the like, and a magnetic layer 2 which is formed over the substrate 1 to withhold information. The magnetic layer 2 has a double-layer structure composed of a first magnetic layer 3 and a second magnetic layer 4. The magnetization in the former reaches its maximum at a low temperature above the magnetic compensation temperature, while the magnetization in the latter reaches its maximum at a high temperature above the magnetic compensation temperature. The former is made of a film of TbCo alloy, and the latter a film of TbFeCo. These films of TbCo alloy and TbFeCo alloy are magnetic materials having their respective compensation points at room temperature.

The following will explain the magnetic material used as the first magnetic layer 3 and second magnetic layer 4. Typical examples of the magnetic material having the compensation point around room temperature include: a film of rare earth-transition metal alloy, a film of iron garnet, etc. A film of rare earth-transition metal alloy having high perpendicular magnetic anisotropy is preferable as a magnetic material suitable in use for high-density perpendicular magnetic recording, that is, as the magnetic material used as the first magnetic layer 3 and second magnetic layer 4.

Further, of all kinds of films of rare earth-transition metal alloy, more preferable than the others is a film of alloy containing at least one of Dy and Tb as a rare earth element and at least one of Fe and Co as a transition metal element. Examples of such a film of alloy include:
films of 2-element alloy, such as DyFe, DyCo, TbFe, and TbCo;
films of 3-element alloy, such as DyFeCo, TbFeCo, DyTbCo, and GdTbCo;
films of 4-element alloy, such as DYTbFeCo, GdTbFeCo, and GdDyFeCo; etc.

It should be appreciated that the films of rare earth-transition metal alloy are not especially limited to the foregoing, and that the films can be made of any magnetic material and the composition thereof is not especially limited as long as the magnetic material satisfies the following conditions (1)–(4).

Condition (1): because the magnetic material is used as the first magnetic layer 3 and second magnetic layer 4, the magnetization in the magnetic material has to be 0 (zero) in total at or around room temperature. By making the magnetization in the magnetic material substantially 0 (zero) in total at or around room temperature, leakage of a magnetic field from other domains where temperatures therein are not raised can be prevented almost completely. In other words, a signal can be reproduced only from the domain where the temperature is raised, thereby making it possible to increase an S/N ratio.

Condition (2): because the magnetic material is used as the first magnetic layer 3 and second magnetic layer 4, the magnetic material has to have a sufficiently large coercive force around room temperature. To be more specific, it is preferable that the coercive force around room temperature is larger than the recording magnetic field of the recording head. Further, in order to ensure stability against a disturbance, it is preferable that the coercive force around room temperature is 5 KOe or greater.

Condition (3): because the magnetic material is used as the first magnetic layer 3 and second magnetic layer 4, the magnetic material has to have large maximum magnetization at or above room temperature. In order to obtain a sufficiently strong signal, it is preferable that the maximum magnetization is 50 emu/cc or greater. In addition, in order to heat the magnetic material to raise the temperature thereof uniformly by means of a semiconductor laser beam, it is preferable that the magnetic material reaches its maximum magnetization at a temperature ranging from 100° C. to 250° C.

Condition (4): because the magnetic material is used as the first magnetic layer 3 and second magnetic layer 4, the coercive force of the magnetic material has to be equal to or lower than the magnetic field applied from the recording magnetic head at an infinite temperature above room temperature. To be more specific, when the magnetic material is heated by means of a semiconductor laser beam in recording information, it is preferable that the coercive force thereof becomes equal to or lower than the magnetic field applied from the recording magnetic head at or above 200° C.

Although it will be described later, by magnetically coupling the first magnetic layer 3 and second magnetic layer 4 to each other, temperature characteristics of the magnetization can be obtained almost as desired. The magnetic coupling referred to herein means either magnetostatic coupling or exchanged coupling. Magnetostatic coupling is defined as coupling by means of a Coulomb force, and exchanged coupling is defined as strong coupling of atoms by a quantum mechanical force.

In the present embodiment, there is a difference of approximately 50° C. in magnetic compensation temperatures between the first magnetic layer 3 and second magnetic layer 4. Also, in the present embodiment, as shown in FIG. 1, the first magnetic layer 3 is formed over the substrate 1, on which the second magnetic layer 4 is layered. However, the arrangement is not limited to the foregoing, and the second magnetic layer 4 may be formed over the substrate 1 and the first magnetic layer 1 may be layered thereon.

Next, the following will describe a manufacturing procedure of the above magnetic recording medium. In order to form the first magnetic layer 3 and second magnetic layer 4 in consecutive steps, three targets respectively made of Tb, Fe, and Co are placed in the chamber of the sputtering device. Each target is provided with a shutter, and a film of a desired element can be formed by opening/closing the shutters.

Then, the substrate 1 is fixed to a substrate holder and cooled with water, and air inside the chamber is released to $2 \times 10^{-4}$ Pa, after which the pressure therein is raised to 5 mTorr by introducing an Ar gas. Then, the first magnetic layer 3 and second magnetic layer 4 are formed consecutively by means of magnetron sputtering, during which the substrate 1 is rotated at 60 rpm using Tb and Fe, and optionally Co as the targets.

In forming a film of the first magnetic layer 3, powers specified as follows are applied to each target: 158 W as a RF power for the Tb target; and 300 W as a DC power for the Co target. Likewise, in forming a film of the second magnetic layer 4, powers specified as follows are applied to each target: 266 W as a RF power for the Tb target; 126 W as a DC power for the Fe target; and 300 W as a DC power for the Co target.

The compositions in atomic percent of the first magnetic layer 3 and second magnetic layer 4 produced under the above conditions are: $Tb_{23}Co_{77}$ and $Tb_{26}Fe_{22}Co_{52}$, respectively. Also, each of the first magnetic layer 3 and second magnetic layer 4 is arranged to have a thickness of 100 nm.

As comparative examples, two magnetic recording media are prepared: one is a magnetic recording medium, in which a single-layer magnetic layer having the same composition as that of the first magnetic layer 3 (TbCo) is formed over the substrate 1; and the other is a magnetic recording medium, in which a single-layer magnetic layer having the same composition as that of the second magnetic layer 4 (TbFeCo) is formed over the substrate 1.

FIG. 2 shows a graph showing the temperature characteristics of magnetization in the magnetic recording medium of the present invention and those of the above comparative magnetic recording media: the magnetic recording medium (A) of the present embodiment composed of the substrate 1, on which TbCo and TbFeCo are sequentially layered in a vertical direction; the comparative magnetic recording medium (B) composed of the substrate 1, on which a single-layer film of TbCo is formed; and the comparative magnetic recording medium (C) composed of the substrate 1, on which a single-layer film of TbFeCo is formed. In the graph, the horizontal axis represents temperatures and the vertical axis represents magnetization converted to normalized values by the maximum magnetization at or above the magnetic compensation temperature. Also, a bold line represents the temperature characteristics of the magnetic recording medium (A); a broken line represents those of the magnetic recording medium (B); and a thin line represents those of the magnetic recording medium (C).

FIG. 2 reveals that, compared with the comparative magnetic recording media (B) and (C), the temperature dependence of magnetization in the magnetic recording medium (A) of the present embodiment is gradual at or around the maximum magnetization.

When information is reproduced from the magnetic recording medium (A) of the present embodiment, variance of the reproducing strength can be suppressed to a range within 10% even when there is a difference of approximately 50° C. in temperature. In contrast, when information is reproduced from either of the comparative magnetic recording media (B) and (C), the reproducing strength varies by approximately 10% if there is a difference of approximately 35° C. in temperature. In other words, according to the magnetic recording medium of the present invention, a more stable reproducing signal can be obtained even if a temperature at the reproducing domain in the magnetic recording medium is changed due a disturbance, such as a change in power of irradiated laser beams, and an ambient temperature.

Further, in order to prevent the change in reproducing strength in a broader temperature range, the temperatures at which the first magnetic layer 3 and second magnetic layer 4 have the maximum magnetization are controlled. To be more specific, the maximum value of Mr is controlled by changing the composition ratio of Fe and Co in the second magnetic layer 4. The ratio of Tb in the composition is adjusted in such a manner that the compensation temperature falls around room temperature.

Consequently, if there is a difference of 80° C. or greater in temperatures at which the first magnetic layer 3 and second magnetic layer 4 respectively have the maximum magnetization, the maximum magnetization of the magnetic layer 2 drops to 80% or less of the magnetization of the single-layer magnetic layer. Thus, such a magnetic recording medium is not suitable for actual use because a magnitude of the reproducing signal is reduced.

Also, it is found effective to secure at least a difference of 5° C. between the maximum magnetization temperatures to induce the effect of a gradual temperature change.

Therefore, in order to obtain a reproducing signal with a sufficient magnitude having a gradual temperature distribution at or around the maximum magnetization, it is preferable that a difference of not less than 5° C. and not more than 80° C. is secured between the temperatures at which the first magnetic layer 3 and second magnetic layer 4 reach their respective maximum magnetization, respectively.

In the present embodiment, a film thickness of the entire magnetic layer 2 is set to 200 nm, but the film thickness is not limited to the foregoing. However, in order to record the information into the magnetic layer 2 uniformly by the recording head, it is preferable to set the film thickness of the entire magnetic layer 2 to 300 nm or smaller.

Also, in the present embodiment, the magnetic layer 2 has a double-layer structure composed of the first magnetic layer 3 and second magnetic layer 4. However, the structure is not limited to the foregoing. The magnetic layer 2 may have a multi-layer structure (triple or more). In this case, a more gradual temperature change can be realized around the maximum magnetization of the entire magnetic layer.

In the present embodiment, the first magnetic layer 3 and second magnetic layer 4 are formed by means of sputtering. However, the forming method is not limited to the foregoing. For example, the layers 3 and 4 may be formed by means of molecular beam epitaxy, vacuum deposition, ion beam deposition, etc.

In the present embodiment, when forming the first magnetic film 3 and second magnetic film 4 by means of sputtering, the targets are provided separately for each metal component. However, the targets are not necessarily provided separately. For example, the sputtering can be conducted with an alloy target or a composite target. The composite target is prepared by placing metal components having the smaller ratio on a target of a metal component having the largest ratio.

As to a film of the rare earth-transition metal alloy, the temperature characteristics of magnetization, namely, the temperature dependence of magnetization or coercive force, can be changed consecutively by changing the composition of the rare earth elements and transition metal elements continuously. Thus, when forming a layer from several elements of the same group, preferably, TbFeCo, DyFeCo, TbDyFeCO, GdTbFeCo, and GdDyFeCo, a multi-layer, each layer attaining maximum magnetization at a different temperature, can be readily formed by merely changing the power supplied to each target instead of replacing the targets.

In the present embodiment, the magnetic layer 2 is provided at one side of the substrate 1. However, in order to increase a recording capacity per medium, the magnetic layer 2 can be provided to both sides of the substrate 1.

In the present embodiment, the magnetic layer 2 is directly formed over the upper surface of the substrate 1. However, an anti-oxidant film or a soft magnetic film may be formed on the substrate 1 before the magnetic layer 2 is formed. For example, the anti-oxidant film can be made of nitride compounds, such as AlN and SiN. However, the anti-oxidant film can be made of any appropriate material as long as oxidation of the magnetic layer 2 from the substrate 1 side can be prevented. When the reproducing magnetic head is composed of a single magnetic pole head, the soft magnetic film can help the leakage flux to go into the reproducing head efficiently. A typical material of the soft magnetic layer is permalloy, but any material showing soft magnetization in an in-plane magnetization film is available.

In the magnetic recording medium of the present embodiment, a protecting layer or a lubricant layer may be additionally provided over the magnetic layer 2 to improve resistance to impact, abrasion, and corrosion with respect to the magnetic head. The protecting layer can be made of any material having excellent resistance to impact, abrasion, and corrosion, examples of which include: an amorphous carbon film, a diamond-like carbon film, a carbon nitride film, a carbon hydride film, etc. The lubricant layer can be made of any material capable of reducing abrasion between the magnetic head and magnetic recording medium, examples of which include fluorine-based materials, such as perfluoropolyether.

In the magnetic recording medium of the present embodiment, a glass substrate is employed as the substrate 1, but the arrangement is not limited to the foregoing. For example, the substrate 1 can be a sapphire substrate, an aluminum substrate, polycarbonate, PMMA (polymethyl methacrylate), a glass 2p substrate (a substrate composed of a glass substrate on which a photo-polymer resin layer having irregularities, such as grooves and pits, is formed by means of photo-polymerization), ceramics, silicon wafer, etc.

As has been discussed, the magnetic recording medium of the present invention is a magnetic recording medium, into which information is recorded by applying an external magnetic field from a recording magnetic head while a temperature is being raised in a target recording track, and from which information is reproduced using a reproducing magnetic head while a temperature is being raised in a target reproducing track, comprising:

at least two magnetic layers, each having different magnetization, coercive force, and temperature characteristics, both having their respective magnetic compensation temperatures around room temperature, the magnetic layers being magnetically coupled to each other.

Further, it is preferable that the magnetic recording medium of the present invention is arranged such that each of the magnetic layers has a different maximum magnetization temperature at or above the magnetic compensation temperature.

According to the above arrangement, by magnetically coupling two or more layers having their respective maximum magnetization temperatures at or above the magnetically compensation temperature, a magnetic recording medium can be provided with gradual temperature characteristics around the maximum magnetization, which has never been realized with a single-layer magnetic layer. When information is reproduced from the magnetic recording medium having gradual temperature characteristics around the maximum magnetization, a reproducing signal having a stable S/N (Signal-to-Noise ratio) can be obtained even if there is some change in temperature.

Herein, the maximum magnetization is defined as the largest magnitude of magnetization at or above the magnetic compensation temperature, and the maximum magnetization temperature is defined as the temperature at which the maximum magnetization is obtained.

Further, it is preferable that the magnetic recording medium of the present invention is arranged such that there is a difference of not less than 5° C. and not more than 80° C. in maximum magnetization temperatures between the magnetic layers.

At temperatures at or above the magnetic compensation temperature, if a difference in maximum magnetization temperatures between the magnetic layers exceeds 80° C., the maximum magnetization is reduced to 80% of the maximum magnetization when the single-layer magnetic layer is used, which is undesirable as characteristics of the magnetic recording medium. Thus, like the above arrangement, if a difference in maximum magnetization temperatures between the magnetic layers is controlled to be not less than 5° C. and not more than 80° C., a gradual temperature distribution of magnetization can be obtained around the maximum magnetization, while at the same time a magnetic recording medium capable of producing a sufficiently large reproducing signal can be obtained. In order to induce the gradual temperature change, it is more effective to have a difference of 5° C. or more in maximum magnetization temperatures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium on which information is recorded by application of an external magnetic field from a recording magnetic head while a temperature is being raised in a target recording track, and from which information is reproduced using a reproducing magnetic head while a temperature is being raised in a target reproducing track, the magnetic recording medium comprising:

at least two magnetic layers magnetically coupled to each other, wherein each magnetic layer's magnetic compensation temperature is substantially around room temperature, and wherein each magnetic layer has a differing magnetization, coercive force, and temperature characteristic.

2. The magnetic recording medium of claim 1, wherein each of said magnetic layers has a different maximum magnetization temperature at or above the magnetic compensation temperature.

3. The magnetic recording medium of claim 2, wherein a difference in maximum magnetization temperatures between said magnetic layers is not less than 5° C. and not more than 80° C.

4. The magnetic recording medium of claim 1, wherein each of said magnetic layers is made of amorphous alloy composed of a rare earth element and at least one of Fe and Co.

5. The magnetic recording medium of claim 2, wherein each of said magnetic layers is made of amorphous alloy composed of a rare earth element and at least one of Fe and Co.

6. The magnetic recording medium of claim 3, wherein each of said magnetic layers is made of amorphous alloy composed of a rare earth element and at least one of Fe and Co.

7. The magnetic recording medium of claim 4, wherein said rare earth element includes at least one element selected from Tb, Dy, and Gd.

8. The magnetic recording medium of claim 5, wherein said rare earth element includes at least one element selected from Tb, Dy, and Gd.

9. The magnetic recording medium of claim 6, wherein said rare earth element includes at least one element selected from Tb, Dy, and Gd.

10. The magnetic recording medium of claim 4, wherein each of said magnetic layers is based on a same alloy having a different composition.

11. The magnetic recording medium of claim 7, wherein each of said magnetic layers is based on a same alloy having a different composition.

12. The magnetic recording medium of claim 1, wherein a thickness of said magnetic layers in total is 300 nm or less.

13. The magnetic recording medium of claim 1, wherein said magnetic layers are provided to each of surfaces of a substrate.

14. The magnetic recording medium of claim 1, wherein said magnetic layers are provided on a substrate through an anti-oxidant film.

15. The magnetic recording medium of claim 1, wherein said magnetic layers are provided on a substrate through a soft magnetic film.

16. The magnetic recording medium of claim 1, wherein a protecting layer is provided on said magnetic layer at a side where the magnetic heads are provided.

17. The magnetic recording medium of claim 1, wherein a lubricant layer is provided on said magnetic layer at a side where the magnetic heads are provided.

18. A magnetic recording medium which performs recording and reproducing functions by raising temperatures of target recording and reproducing tracks, the magnetic recording medium comprising:

a substrate; and a recording layer formed on said substrate and made of a magnetic material, said recording layer including:

a first magnetic layer having a magnetic compensation temperature of substantially around room temperature, and having a maximum magnetization temperature of not less than room temperature, and a second magnetic layer magnetically coupled with said first magnetic layer and having a magnetic compensation temperature of substantially around room temperature and a maximum magnetization temperature of not less than room temperature, wherein the magnetization temperatures of the first and second magnetic layers are different.

19. A magnetic recording medium which performs recording and reproducing functions by raising temperatures of target recording and reproducing tracks, the magnetic recording medium comprising:

a substrate; and a recording layer formed on said substrate and made of a magnetic material having a magnetic composition temperature of substantially around room temperature and a maximum magnetization temperature of not less than room temperature, wherein the magnetic material is comprised of-a metal alloy having a composition that includes at least one rare earth metal and at least one transition metal, and wherein, the magnetic material has temperature dependent magnetization and coercive force characteristics, the temperature dependence of which are changed upon continuous variation in the composition of the magnetic material.

20. The magnetic recording medium of claim 19, wherein each of said at least one transition metal is selected from the group consisting of iron and cobalt, and each of said at least one rare earth metal is selected from the group consisting of dysprosium, terbium, and gadolinium.

21. The magnetic recording medium of claim 19, wherein the continuous variation in the composition of the magnetic material occurs with respect to a thickness direction of the magnetic material.

* * * * *